(12) United States Patent
Roll et al.

(10) Patent No.: US 6,701,243 B1
(45) Date of Patent: Mar. 2, 2004

(54) METHOD AND DEVICE FOR CONTROLLING TRACTION SLIP

(75) Inventors: Georg Roll, Heusenstamm (DE); Frank Haller, Frankfurt (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 10/018,763

(22) PCT Filed: Jun. 13, 2000

(86) PCT No.: PCT/EP00/05428

§ 371 (c)(1),
(2), (4) Date: May 2, 2002

(87) PCT Pub. No.: WO00/78584

PCT Pub. Date: Dec. 28, 2000

(30) Foreign Application Priority Data

Jun. 17, 1999 (DE) .......................................... 199 27 660
Jun. 6, 2000 (DE) .......................................... 100 27 628

(51) Int. Cl.$^7$ .................................................. G05D 1/00
(52) U.S. Cl. ............................. 701/83; 701/84; 701/82; 303/141
(58) Field of Search ............................. 701/83, 84, 82, 701/90; 303/141

(56) References Cited

U.S. PATENT DOCUMENTS

| 4,950,038 | A | * | 8/1990 | Ocvirk et al. | ............ | 303/113.2 |
| 5,164,902 | A | * | 11/1992 | Kopper et al. | ................ | 701/76 |
| 5,383,718 | A | * | 1/1995 | Burgdorf et al. | ......... | 303/113.2 |
| 5,573,315 | A | * | 11/1996 | Schmitt et al. | ............. | 303/141 |
| 5,980,000 | A | * | 11/1999 | Kolbe et al. | ................ | 303/139 |

FOREIGN PATENT DOCUMENTS

JP          04231254      *   8/1992

* cited by examiner

Primary Examiner—Marthe Y. Marc-Coleman
(74) Attorney, Agent, or Firm—Rader, Fishman & Grauer PLLC (57) ABSTRACT

The present invention relates to a method and a device for controlling traction slip, wherein a variable defining the wheel behavior on at least one of the driven wheels is determined, and control states such as increase brake pressure, decrease brake pressure, or maintain brake pressure are controlled in dependence on this variable, and the change-over between the control states, such as increase brake pressure, decrease brake pressure, or maintain brake pressure, or switch on or off traction slip control are regulated. In order to improve the control, at least one further variable which represents the running stability of the engine, is included in the control of the control states and/or the switch-over between the control states.

55 Claims, 6 Drawing Sheets

E_S_R = ENGINE_STABILITY_RESERVE

METHOD AND DEVICE FOR CONTROLLING TRACTION SLIP

TECHNICAL FIELD

The present invention generally relates to vehicle brakes, and more particularly relates to a method and a device for controlling traction slip.

BACKGROUND OF THE INVENTION

When driving on very rough or slippery road surfaces, high traction slip values may occur at the wheels of a vehicle even if the driver accelerates only slightly, that means, the engine has only a low excess torque or traction torque. On rough surfaces this is due to the fact that single wheels will lose ground contact at least temporarily in part or in total. On slippery surfaces, the coefficient of friction between the roadway and one or more wheels may be so low that even a low engine torque will cause spinning of the wheels.

When traction control intervenes in such situations, i.e., the control of tractive force which acts by way of an active pressure increase at the wheel brake circuits (BTCS=Brake Traction Control System), stalling of the engine may be caused when the vehicle is equipped with a manually operated transmission and the driver has engaged the clutch. Such a style of driving is conventional even at low vehicle speeds when the driver recognizes that the wheels generally tend to spin. More particularly, full engagement of the clutch is appropriate in offroad driving when the vehicle has a countershaft transmission and there is an extreme gearing-down in a low off-highway gear.

In general, brake-induced 'stalling situations' can be avoided because a permanent monitoring of the engine speed, for example, is carried out during traction control. When e.g. the engine speed falls below a critical threshold ('stalling speed'), the risk of stalling of the engine is detected. In the case of such a stalling risk, the active brake pressure increase on the wheels will be stopped, and pressure decrease can be effected with the maximum possible decrease gradient in order to relieve the engine.

Pressure decrease is usually stopped when the engine speed has reached values again which confirm a stabilization of the engine run.

A measure of this type prevents direct stalling of the engine in the majority of cases. It is disadvantageous that the entire control mostly acts very abruptly and causes frequent stuttering of the engine. On difficult off-road tracks, a driver may become disconcerted by such an abrupt intervention and may be induced to even reduce opening of the throttle, which may further impair the performance of the control. The less the throttle is opened, the greater the risk of stalling the engine in the case of an active braking. In addition, complete brake evacuation may lead to unexpected vehicle reactions, such as a sudden rolling back on a hill.

Figure 1:
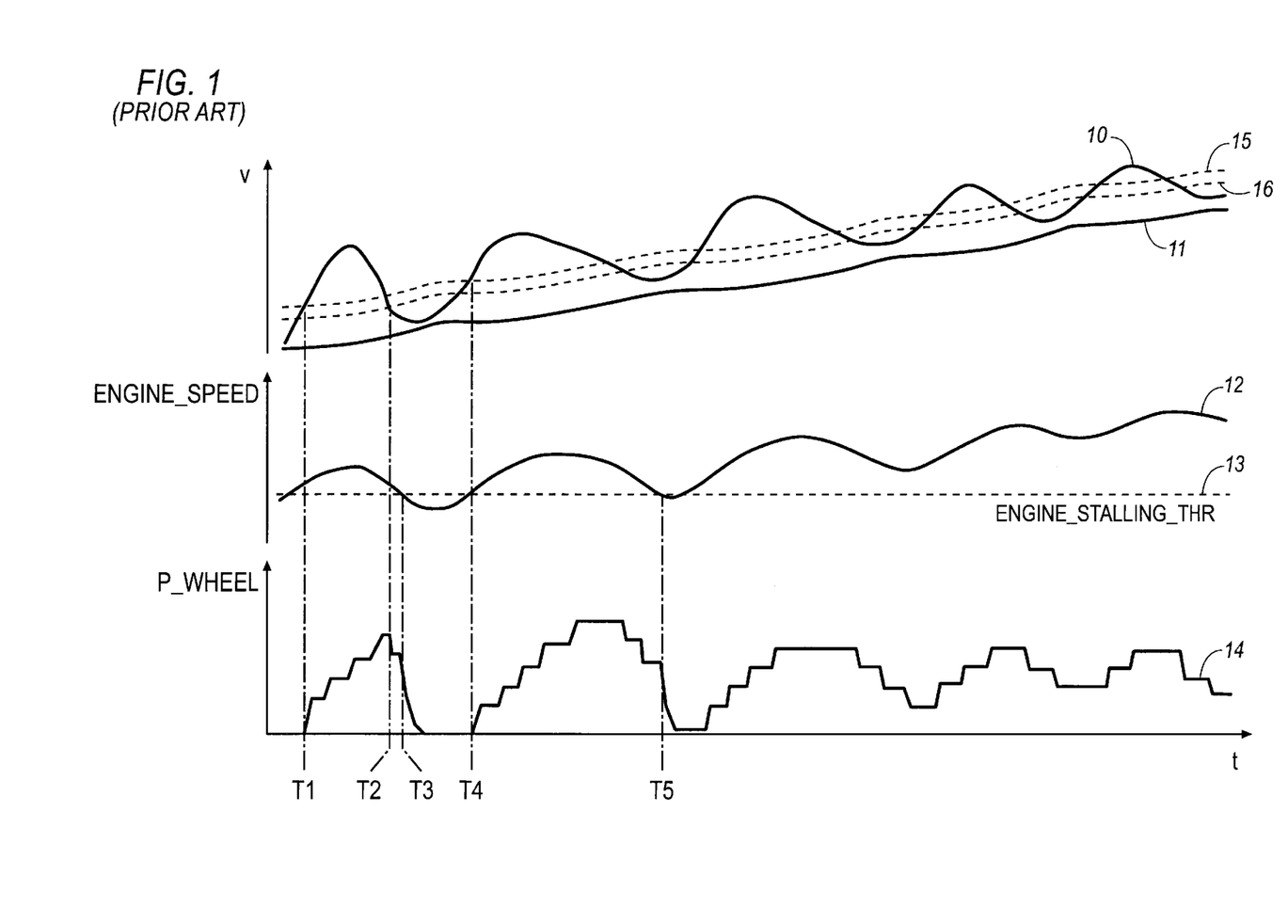
FIG. 1 shows a diagram of the wheel and vehicle speed variation, the engine speed, and the brake pressure variation in a prior-art BTCS control.

FIG. 1 shows a conventional BTCS control with the example of a spinning wheel.

In this illustration, reference numeral 10 designates the speed variation of the wheel that tends to spin, reference numeral 11 designates the vehicle speed or a substitute value estimated within the controller, reference numeral 12 is assigned to the engine speed, 13 to a speed threshold, and 14 designates the variation of the pressure which the BTCS delivers into the associated wheel brake circuit. Signals 15 and 16 show two speed thresholds which are calculated during the BTCS control on the basis of slip values (in percent) and determine the change-over between different control states.

The control starts with a pressure increase at the point of time T1 when the speed 10 of the spinning wheel has exceeded the higher speed threshold 15. The subsequent pulsed pressure increase ends at the point of time T2 when the wheel speed 10 has fallen below a lower threshold 16. Then a normally pulsed pressure decrease will start. Directly afterwards (point of time T3) the engine speed drops below the speed threshold 13 in the embodiment shown which triggers a pressure decrease with the maximum gradient (unpulsed) according to the conventional control strategy. This steep pressure decrease is required to prevent 'stalling' of the engine in time.

After the engine speed has increased again, the pressure increase after the point of time T4 will be dictated by the slip of the greatly spinning wheel again and will be performed in a relatively steep fashion which, in turn, causes a strong load on the engine and decrease of the rotational speed with a new instability at the point of time T5.

According to the greatly simplified concept in FIG. 1, the change-over between the control states 'pressure increase' and 'pressure decrease' depends on thresholds which, for reasons of clarity, are calculated equidistantly to the (estimated) vehicle speed.

However, the shortcoming of the conventional control is generally seen in that a reaction to the engine in the form of a wheel pressure decrease typically occurs only when the engine speed has dropped below a critical speed threshold. In all other respects, the control and the pressure modulation are only dictated by the behavior of the spinning wheels.

In view of the above, an object of the present invention is to provide a method and a device for controlling traction slip which permit greater engine stability.

According to the present invention, this object is achieved in that a generic method is performed so that at least one further variable which represents a running stability of the engine, is included in the control of the control states and/or the switch-over between the control states.

This renders it possible to make fine adjustments to the traction slip while taking into account the engine situation. The control is dictated by the engine situation which is taken into consideration in each phase of controlling the traction slip. Beside the traction slip (wheel speed and/or wheel acceleration), the running stability of the engine or an engine stability reserve derived therefrom is a controlled variable which is taken into consideration when the correcting variable is formed.

Another object of the present invention is to design a generic device for controlling the traction slip so that a first determination device determines a variable which determines a wheel behavior (speed and/or acceleration) on at least one of the driven wheels and, in dependence on this variable, controls control states such as increase brake pressure, reduce brake pressure, or maintain brake pressure, and regulates the change-over between the control states such a increase brake pressure, reduce brake pressure, or maintain brake pressure, or switch on or off traction slip control, and a second determination device determines at least one further variable which represents a running stability of the engine and makes the first determination device become involved in the control of the control states and/or the change-over between the control states.

To further improve the control behavior, the second variable is continuously considered in the control and/or change-over.

The running stability of the engine is calculated from the difference between an engine speed$_{F-E-S}$ and a dynamic instability threshold of the engine, preferably according to the following relation:

ENGINE_STABILITY_RESERVE=$K1$•(FILTERED_ENGINE_SPEED−ENGINE_STALLING_THR), with ENGINE_STABILITY_RESERVE=running stability of the engine, K1=a constant dependent on the engine characteristic and on the average vehicle weight, FILTERED_ENGINE_SPEED=the filtered engine speed, and ENGINE_STALLING_THR is the instability threshold.

The running stability of the engine or the engine stability reserve is formed by the difference between the current (filtered) engine speed and a dynamic instability threshold according to the relation mentioned hereinabove in that the dynamic instability threshold was calculated by that a portion is subtracted from a vehicle-related base value which is determined proportionally to the gradient of the engine speed.

The second variable is used for switching over between the pressure-increase and pressure-decrease control phases of the BTCS by initiating a pressure decrease when the second variable falls below a lower threshold value, and a pressure increase is not permitted until the second variable exceeds a higher threshold value.

In the case of pressure increase during traction control, a maximum pressure increase gradient is predetermined by the second variable, and a high running stability of the engine permits a steeper pressure increase, while a low running stability forces a flatter pressure increase.

The decrease and increase gradients are adapted into the engine characteristic, and a higher engine torque renders possible a faster increase and a slower decrease of wheel pressures.

The terms 'steeper' and 'flatter' pressure increase or decrease refer to the pressure modulations which the per se known BTCS control would provide.

In the case of a pressure decrease during traction control, a minimum pressure decrease gradient is predetermined by the second variable, and a high running stability of the engine allows a flat pressure decrease, while a low running stability forces a steeper pressure decrease.

The method according to the present invention ensures even with a very moderate style of driving that a medium pressure level to be mastered by the engine is introduced into the brake circuits of the wheels that tend to spin so that a traction control is achieved which takes into consideration not only the wheel slip situation but also the engine situation so that an optimal compromise is reached. The driver senses this control as being so smooth that 'playing with the accelerator pedal' is possible in difficult situations, whereby the vehicle can be balanced e.g. on a steep, bumpy slope.

This measure can be employed for any types of drives. Even with an automatic transmission which typically prevents stalling of the engine on its own, the mentioned method permits achieving a considerable improvement of the control comfort and the control function.

The method is based on the idea of not only considering the traction slip as a controlled variable in the event of spinning of one wheel but to permanently adapt the cyclic pressure increase and pressure decrease on a wheel to the engine situation.

This means that if a vehicle tends to spin already when the accelerator pedal is only slightly depressed, only a delayed and flat pressure increase is allowed to be performed in the beginning. When the engine speed is reduced by this pressure increase, a pressure stop or even pressure decrease may occur already when the wheel continues to show spinning tendencies and the engine speed has not yet exceeded a threshold which is deemed to be a critical 'stalling speed' for the respective type of engine.

If, however, the engine exhibits again a stabilization in the way of a rising rotational speed, it may be subjected to being newly loaded due to pressure increase. However, pressure increase is not dictated by the degree of the wheel spin, i.e., by the wheel slip, but by the 'stability' of the engine. Only if the engine is operated at high speed will traction control pass over into a pure wheel slip control.

This type of control is advantageous because the engine, from the very beginning, is only loaded to such an extent that an instability tendency is unlikely to occur. This avoids the development of high pressure peaks which would always have to be removed very quickly to prevent a destabilization of the engine.

The control state and the degree of pressure modulation are provided in dependence on a defined engine stability reserve. The latter, in turn, is calculated from the difference between the current engine speed and an instability threshold.

With a small stability reserve, there will be an early switch-over to the control state 'maintaining of pressure' or even 'pressure decrease'.

On the contrary, the control state 'pressure increase' may only be activated when the stability reserve has exceeded a high threshold value.

In the control state 'pressure increase', the pressure increase gradient is calculated as a function of the stability reserve by building up the pressure with a lower gradient in the event of a small reserve.

In the control state 'pressure decrease', the pressure decrease gradient is also calculated as a function of the stability reserve by reducing the pressure with a higher gradient in the event of a small reserve.

When the value of the stability reserve amounts to zero, pressure decrease with the hydraulically possible maximum gradient will occur.

DETAILED DESCRIPTION OF THE PREFERRED EMBODIMENTS

To perform an engine-load-adaptive control, extended signal formation is required. In particular, a signal is formed which has the meaning of a 'variable representing the running stability of the engine' or of an 'engine stability reserve'.

$$\text{ENGINE\_STABILITY\_RESERVE}=K1*(\text{FILTERED\_ENGINE\_SPEED}-\text{ENGINE\_STALLING\_THR}) \quad \text{(Equation 1)}$$

The magnitude of this signal is a standard regarding how much the engine allows being loaded by wheel brake interventions. To this end, initially the filtered engine speed FILTERED_ENGINE_SPEED is calculated by having the engine speed ENGINE_SPEED which was read in by way of a bus inside the vehicle (for example, CAN bus) undergo a simple filtering operation with a filter of first order or nth order. This is necessary to smoothen possible abrupt signal changes which are usually due to the asynchronous sending and receiving of the bus data.

A primitive digital filter may e.g. be realized by the following formula for a proportional delay member of first order (PT1 member):

$$\text{FILTERED\_ENGINE\_SPEED}=\text{FILTERED\_ENGINE\_SPEED}+n*(\text{ENGINE\_SPEED}-\text{FILTERED\_ENGINE\_SPEED}) \quad \text{(Equation 2)}$$

wherein n=2, 3, 4 ...

When this calculation is performed in each control loop and the run time of the control loop (Loop Time) amounts to T, the filter time constant of $$T\_\text{filt}=n*T \quad \text{(Equation 3)}$$

is achieved.

A decisive factor is the signal ENGINE_STALLING_THR which represents a dynamic instability threshold for the respective engine. The signal is formed by superposition (subtraction) of a vehicle-responsive base value BASE_THR and a portion which takes into consideration the dynamics of the engine speed:

$$\text{ENGINE\_STALLING\_THR}=\text{BASE\_THR}-K2*\text{FILTERED\_ENGINE\_SPEED\_GRADIENT} \quad \text{(Equation 4)}$$

The signal BASE_THR may be formed from a constant and, as the case may be, another term which depends on the vehicle speed:

$$\text{BASE\_THR}=\text{Engine\_dependent\_value}+f(\text{VEHICLE\_REFERENCE\_VELOCITY}) \quad \text{(Equation 5)}$$

This permits taking the fact into account that the risk of stalling of the engine is reduced at a high vehicle speed.

The signal FILTERED_ENGINE_SPEED_GRADIENT represents the dynamic behavior of the engine and is calculated from the difference of the engine speeds of two successive control cycles:

$$\text{FILTERED\_ENGINE\_SPEED\_GRADIENT}=\text{FILTERED\_ENGINE\_SPEED}(t)-\text{FILTERED\_ENGINE\_SPEED}(t-1) \quad \text{(Equation 6)}$$

This implies that the signal FILTERED_ENGINE_SPEED_GRADIENT becomes negative when the engine speed decreases. The gradient becomes positive when the speed increases.

The instability threshold value ENGINE_STALLING_THR is raised by the term 'K2*FILTERED_ENGINE_SPEED_GRADIENT' when the engine speed decreases. In the reverse case, a decrease of the threshold value takes place in the event of a rising engine speed.

Thus, the dynamic behavior of the engine is taken into account in the calculation of the stability reserve ENGINE_STABILITY_RESERVE. The reserve is principally greater when the rotational speed is high or exhibits a rise. In the reverse case, an engine has a small stability reserve when the rotational speed is low or decreases.

The signal ENGINE_STABILITY_RESERVE is now used to influence the entire pressure modulation of the traction control by influencing, on the one hand, the determination of the control state (pressure increase, maintaining the pressure, pressure decrease), and also by influencing, on the other hand, the degree of a pressure modulation (intensity of an abrupt pressure change or pause time between two abrupt pressure changes) by the value of the signal.

Determination of the Control State of a Wheel

To render the control and the power output of the engine as homogeneous as possible, the control state of a spinning wheel is not only dictated by the wheel slip but also by the engine stability reserve.

Figure 2:
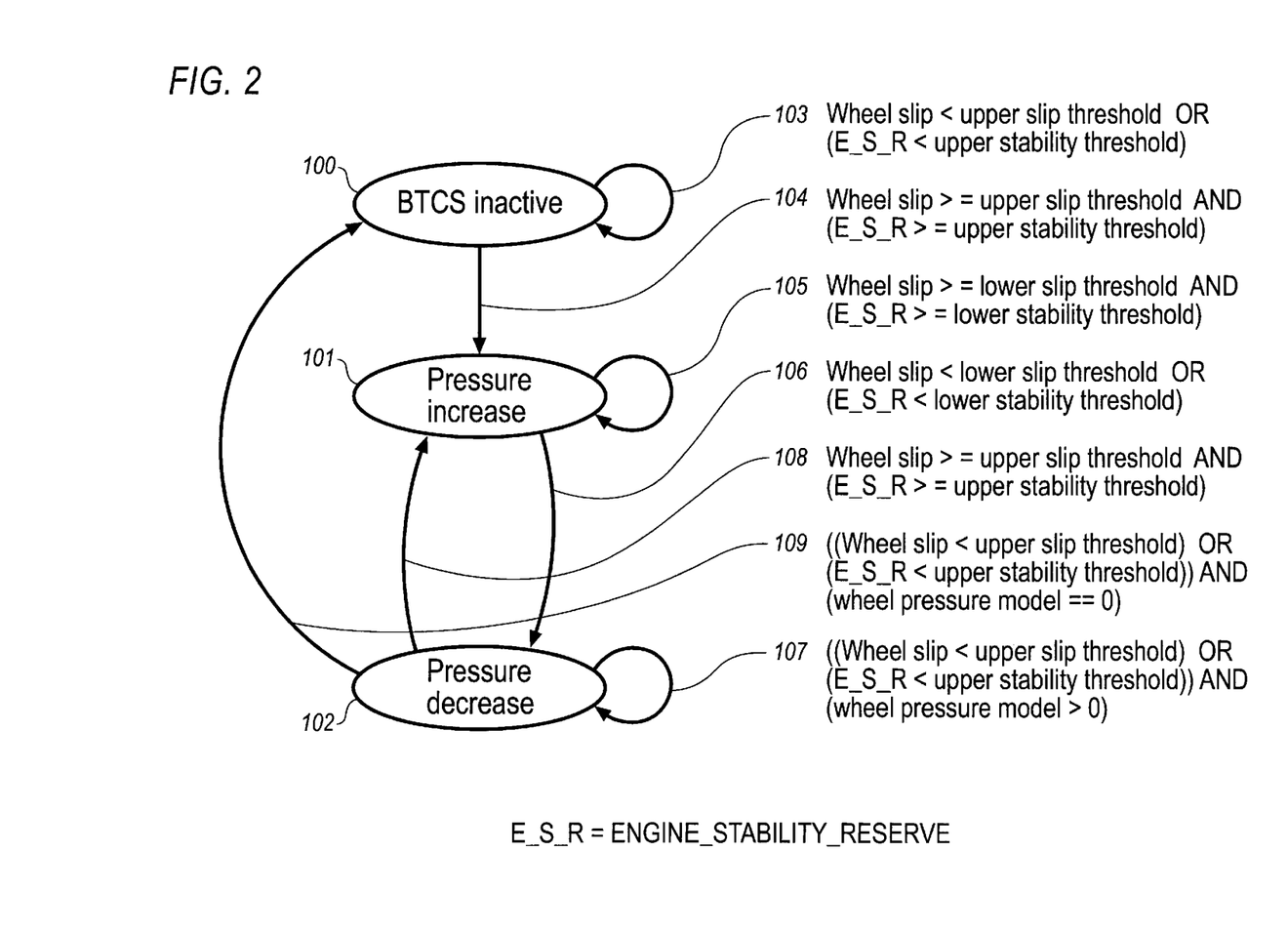
FIG. 2 is a state graph of a BTCS control according to the present invention.

In this respect, FIG. 2 shows a state transition diagram which is extended compared to a conventional traction control. According to the BTCS basis strategy which is greatly simplified as shown herein, there exist only two further control states, i.e. 'pressure increase' 101 and 'pressure decrease' 102, apart from the inactive state 100. Further control states such as, for example, 'maintaining the pressure' or a more differentiated solution with the states 'maintaining the pressure in the increase' and 'maintaining the pressure in the decrease' would be feasible. For the sake of clarity, the simplified concept of FIG. 2 is made the basis herein, even more so because a pressure maintaining state may also be achieved by a pulsed pressure increase and decrease with very long pause times. Generally, the method of the engine-adaptive BTCS control presented herein may also be transferred to concepts with as many further control states as desired. To reach the control state 'pressure increase' 101 for a spinning wheel, that is, to perform one of the function transitions 104 or 108, it typically demanded in the conventional traction system that an upper slip or speed threshold on the wheel concerned is exceeded. The threshold may be formed of a large number of input signals, which can be considered as state of the art and, hence, need not be further dealt with.

In the method disclosed herein, one of the transitions 104 or 108 (depending on the previous state) is tolerated only if in addition to the demanded slip condition there is also a sufficient engine stability reserve (E_S_R=ENGINE_STABILITY_RESERVE). For this reason, both conditions have a logical AND-operation in the diagram in FIG. 2.

In order to stay in the state 'pressure increase' 101 (function transition 105), exceeding of lower thresholds is sufficient according to the simple concept of FIG. 2. This hysteresis is important in order not to provoke a permanent switching to and fro between the states.

To reach the state of 'pressure decrease', i.e., to perform the function transition 106, the conventional system demands that the slip falls below a lower slip threshold. In the method disclosed herein, the transition is carried out already when the engine stability reserve falls below a lower stability threshold. For this reason, both conditions in the diagram in FIG. 2 are given a logical OR-operation.

The 'pressure decrease' state is maintained (function transition 107) until the wheel slip remains below the upper slip threshold or the stability reserve remains below the upper stability threshold and the pressure in the respective wheel pressure circuit has not yet been reduced to zero, which may be estimated by way of a simple pressure model.

When a model pressure of 0 bar is reached, the BTCS on the wheel becomes inactive again (function transition 109) when wheel slip or stability reserve continue lying below their upper thresholds, and the system subsequently performs the function transition 103 until the condition for the transition 104 is satisfied again.

Calculation of the Pressure Increase and Decrease Gradients

In a hydraulic system operating on the basis of solenoid switch valves, the gradient of a pressure increase or decrease may be varied by switching so-called standard pulses for the pressure increase and decrease which are interrupted by a differing number of pause cycles. Any practical gradients may be achieved by this pulse pause ratio, and the hydraulically maximum possible gradient is activated when the pause time 0 is chosen.

A standard pulse may e.g. be realized by performing a pressure increase or decrease for a complete control cycle. However, this will not result in constant pressure stages. A better possibility resides in determining the current operating point on the volume/pressure characteristic curve of the wheel brake circuit by way of a following pressure model and then calculating the duration of the valve actuation so that a constant pressure change of e.g. 2 or 3 bar will occur irrespective of the prevailing operating point.

Independently thereof, the method disclosed herein provides checking in the case of a pressure increase whether the pause time between the pressure increase pulses was calculated too short by the conventional logic, which would lead to a too steep pressure increase gradient with respect to the engine stability reserve.

Therefore, a direct comparison of the signal PAUSE_TIME calculated in the conventional controller on the basis of the wheel behavior with a value which is calculated inversely proportionally to the stability reserve is carried out:

if PAUSE_TIME<$K3$/ENGINE_STABILITY_RESERVE from this follows: PAUSE_TIME=$K3$/ENGINE_STABILITY_RESERVE  (Equation 7: pressure increase)

Herein, K3 is a constant which depends on the characteristic of the brake and the level of the pressure stages.

Thus, if the pause time was calculated to be too short with respect to the stability reserve, there will be a rise to the limit value K3/ENGINE_STABILITY_RESERVE, which leads to a flatter pressure increase gradient and a reduced engine load.

Further, the method disclosed therein provides checking in the case of a pressure decrease whether the pause time between the pressure decrease pulses was calculated by the conventional logic to be too long, which would lead to a long period of maintaining the pressure or to a too flat pressure decrease gradient with respect to the engine stability reserve.

From this follows a direct comparison of the signal PAUSE_TIME with a value which is calculated proportionally to the stability reserve:

if PAUSE_TIME>$K4$*ENGINE_STABILITY_RESERVE from this follows: PAUSE_TIME=$K4$*ENGINE_STABILITY_RESERVE  (Equation 8: pressure decrease)

Herein, K4 is also a constant that depends on the characteristic of the brake and the level of the pressure stages.

Thus, if the pause time was calculated to be too long with respect to the stability reserve, there will be a reduction to the limit value K4*ENGINE_STABILITY_RESERVE, which leads to a steeper pressure decrease gradient and a reduced engine load.

Figure 3:
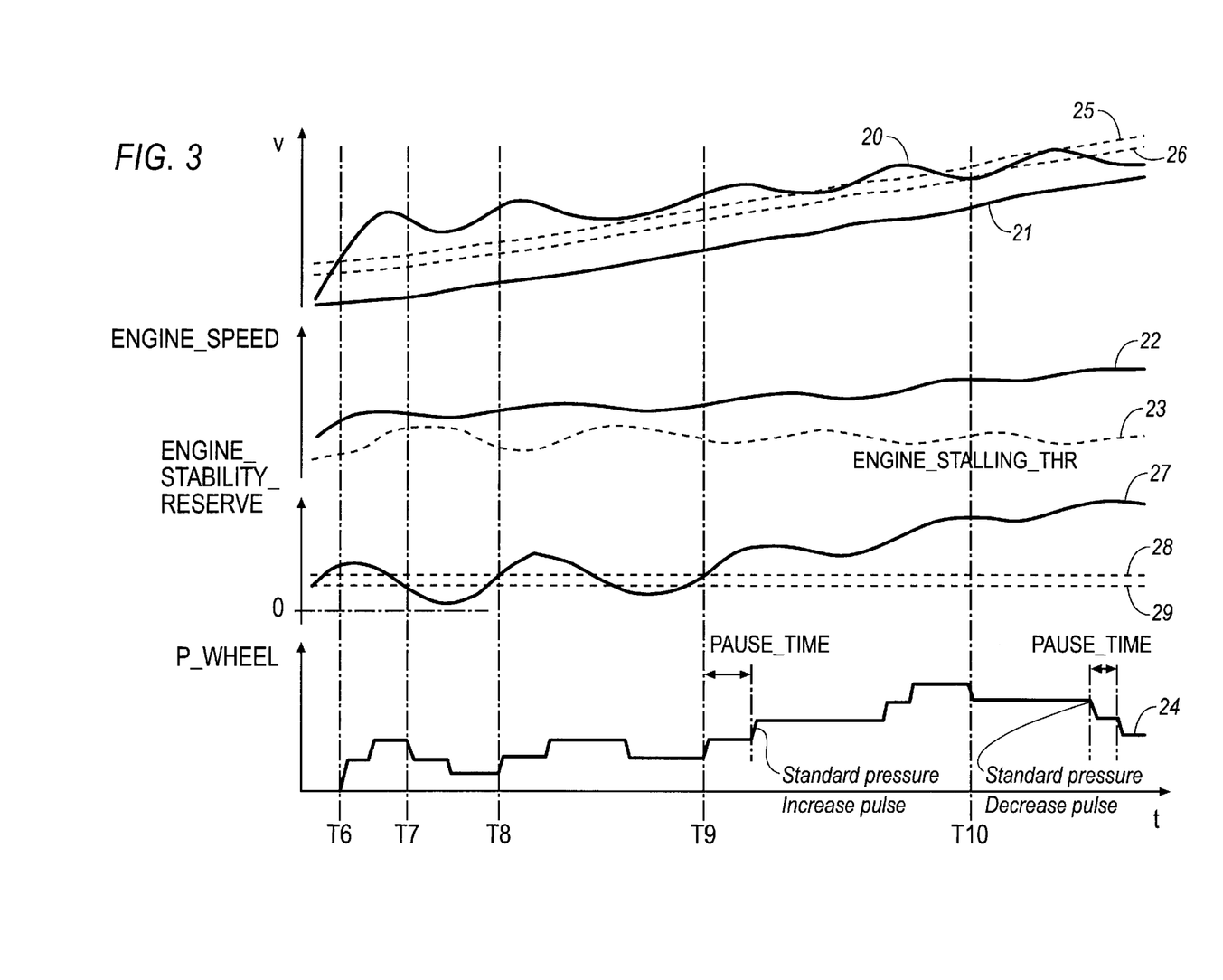
FIG. 3 is a diagram showing the wheel and vehicle speed variation, the instability threshold, the running stability of the engine, and the brake pressure variation according to the present invention.

FIG. 3 shows the pressure profile achieved as the sum of the measures as a comparison to the conventional system behavior in FIG. 1.

The speed of the spinning wheel is illustrated by the signal 20, signal 21 is the (estimated) vehicle speed, and the signals 25 and 26 show an upper and a lower speed threshold for assessing the wheel behavior. Both thresholds are calculated herein exemplarily as equidistant speeds to the (estimated) vehicle speed (similar to the course in FIG. 1). The signal 22 shows the engine speed, and the signal 23 shows the dynamic threshold value ENGINE_STALLING_THR. The signal 27 represents the ENGINE_STABILITY_RESERVE calculated from the signals 22 and 23. The signals 28 and 29 show an upper and a lower threshold for the stability reserve.

The signal 24 represents the pressure of the controlled wheel.

The wheel speed exceeds the upper threshold 25 at time T6. Because sufficient engine stability prevails (signal 27 lies above the upper threshold 28), the control state 'pressure increase' may be activated. However, as the stability reserve 27 is low, there will be a rather moderate pressure increase.

At time T7 the stability reserve 27 drops below the lower threshold 29 due to the engine load so that a switch-over to 'pressure decrease' is performed although the wheel speed 20 is still considerably above both thresholds 25 and 26, i.e., the wheel undoubtedly tends to spin. However, the pressure decrease is not performed unpulsed because the stability reserve is still greater than zero, that means, no direct engine instability prevails.

At time T8, the stability reserve 27 has increased again in excess of the upper threshold 28 so that a new pressure increase is activated which prevents further spinning of the wheel. Due to the previously higher wheel speed, the engine was able to also operate at higher rotational speeds and, thus, will have a higher load-carrying ability in the following time.

Starting from time T9 the stability will be so high that the control will again become more oriented to the wheel behavior. The pressure decrease at time T10 is a consequence of the reduced wheel slip.

Compared to the conventional control, the result is the considerably flatter pressure profile 24 with more moderate pressure decrease and increase gradients. The fluctuation of the engine speed is considerably reduced because the load of the engine is more homogeneous.

The permanent adaption of the control to the engine behavior avoids that the engine speed falls below the instability threshold ENGINE_STALLING_THR.

The result thereof is also a more homogeneous performance and torque output of the engine and a higher average rotational speed and a higher average engine torque.

All in all, this type of control brings about an improved acceleration behavior of the vehicle itself.

Realization Example

Figure 4:
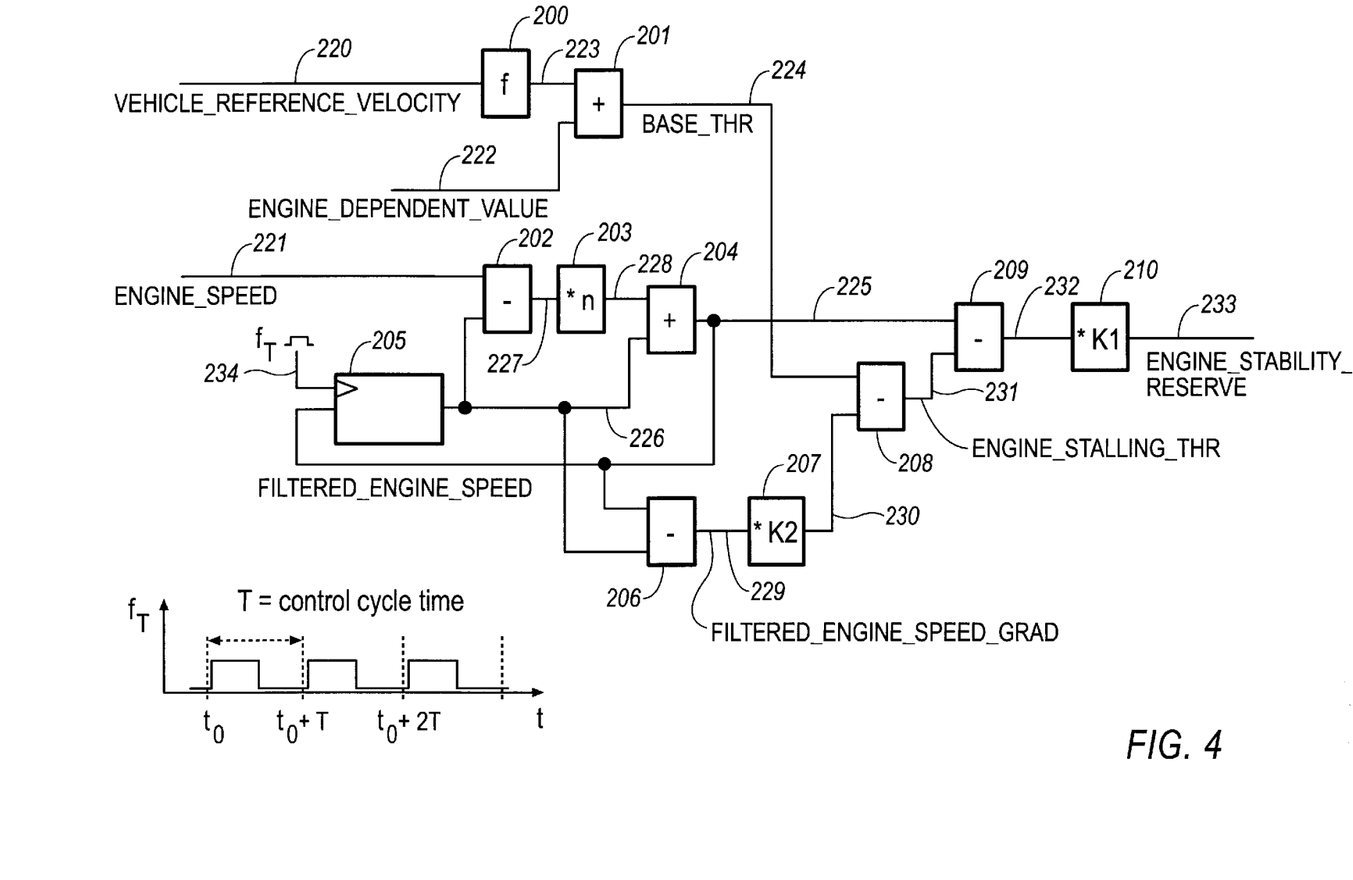
FIG. 4 shows a circuit for determining the running stability of the engine.
Figure 5:
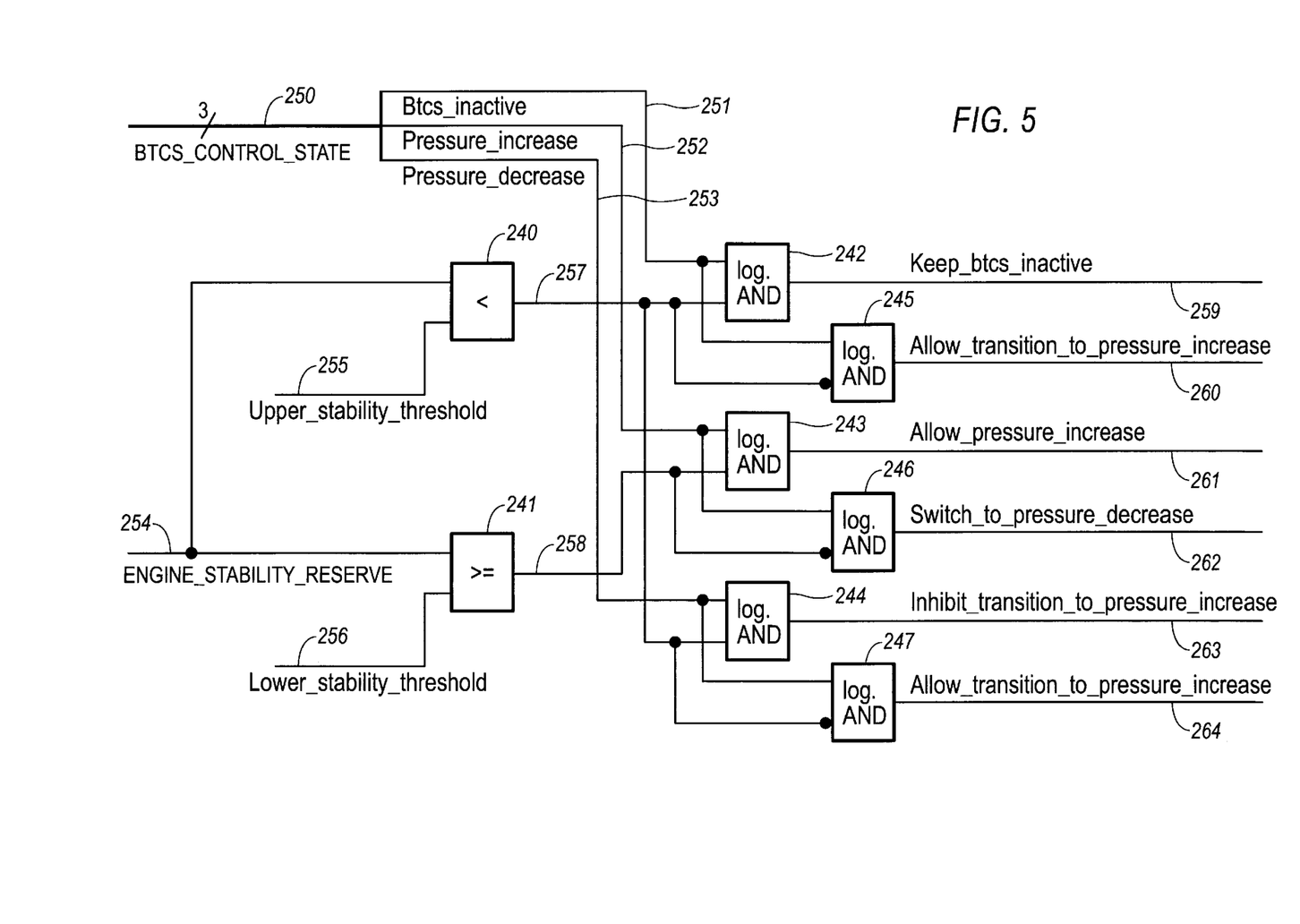
FIG. 5 shows a circuit for controlling the traction slip according to the present invention.
Figure 6:
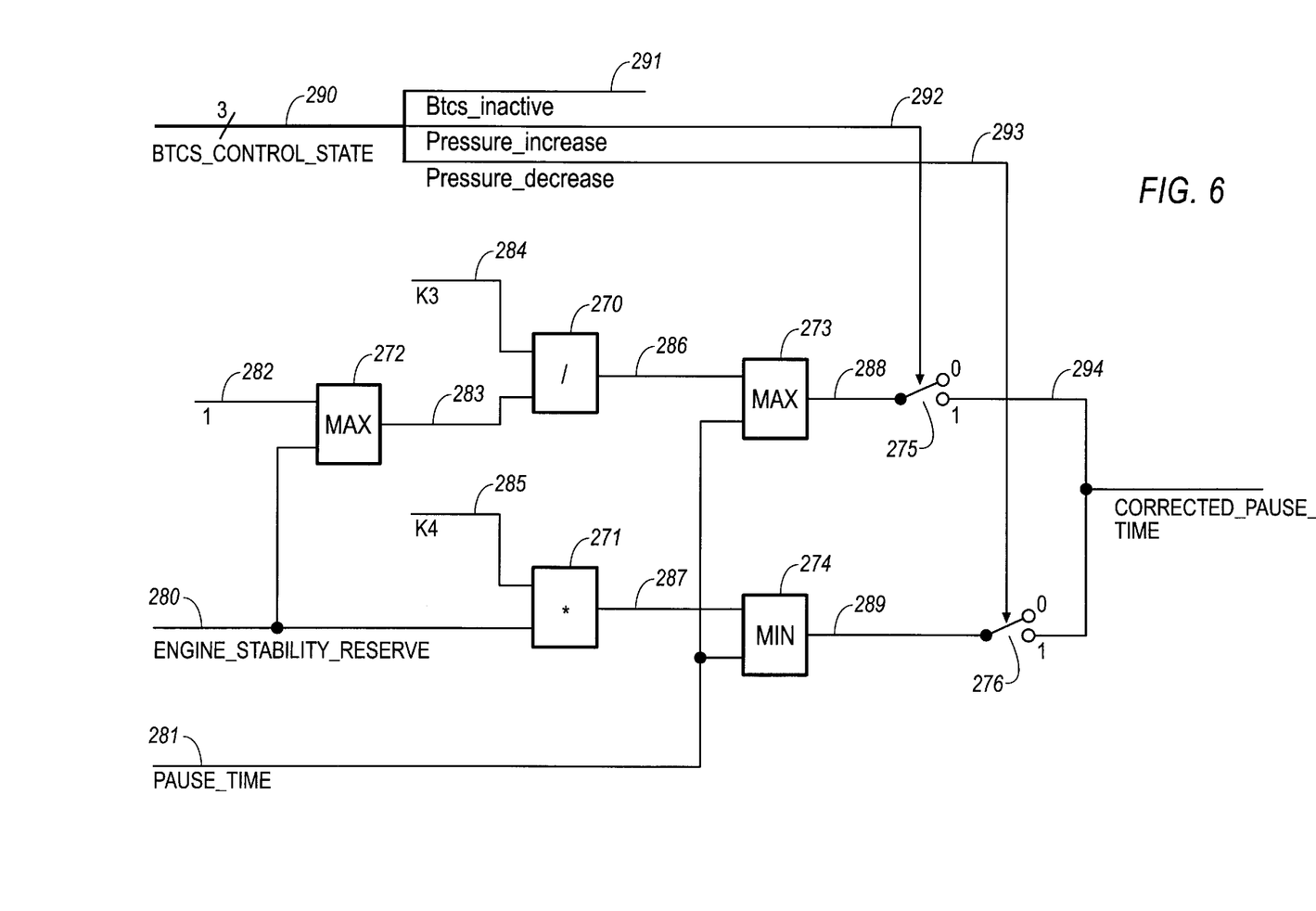
FIG. 6 shows a circuit for determining a pulsed switching signal according to the present invention.

FIGS. 4, 5 and 6 show a realization example.

In FIG. 4, a device is illustrated which produces the output signal ENGINE_STABILITY_RESERVE at output line 233, which represents the respective engine stability reserve, from the input variables VEHICLE_REFERENCE_VELOCITY at line 220, i.e., the estimated vehicle speed, and ENGINE_SPEED at line 221, i.e., the engine speed which is read in by way of a CAN-bus, for example.

The circuit components 200 and 201 calculate a vehicle-speed-responsive base value BASE_THR (signal 224) according to equation (5) by adding the signal 223 which represents a function of the vehicle speed to a vehicle-related constant Engine_dependent_value (signal 222). The said function may be a multiplication with a constant factor in the most simple case.

It is assumed herein as a practical example that the base value shall amount to 1000 rpm during standstill of the vehicle and a speed increase by 10 km/h shall raise the speed threshold by 100 rpm.

From this results for BASE THR:

BASE_THR=1000 rpm+10 rpm/km/h*VEHICLE_REFERENCE_VELOCITY

The constant Engine_dependent_value would then be 1000 rpm, and the function component 200 would result as multiplier with the factor 10 rpm/km/h.

The components 202, 203, 204, and 205 serve to calculate a filtered engine speed FILTERED_ENGINE_SPEED on signal line 225 according to equation (2).

With the respectively positive edge of the control cycle clock f_T on line 234, the storage cell. 205 takes the value on line 225 and passes it to line 226 to this end. The said value is subtracted from the current engine speed on input line 221 by means of component 202, this difference (signal 227) is multiplied with a factor n by means of component 203, and the result (signal 228) is added by component 204 to the old value of the FILTERED_ENGINE_SPEED which is stored in 205 on line 226. The result according to equation (2) is the new value of the FILTERED_ENGINE_SPEED on line 225, which is taken over into memory 205 at the beginning of the next control cycle and will then be connected as an old value into the output line 226.

By means of component 206, the old FILTERED_ENGINE_SPEED on line 226 is subtracted from the current value on line 225 and the gradient FILTERED_ENGINE_SPEED_GRAD on line 229 is thus generated. According to equation (4), this signal is multiplied by means of component 207 with a constant factor K2, and the result on line 230 is subtracted from signal BASE_THR on line 224 by component 208.

The result is the signal ENGINE_STALLING_THR on line 231 which represents the desired dynamic engine speed threshold that is considered as lowest stable engine speed. The value for K2 depends on the type of engine and may range between 0.1 s and 0.5 s.

An exemplary value for the constant K2 could be 0.2 s. This means that with a reduction of the engine speed by 1000 rpm in one second, that is with a gradient of −1000 rpm/s, the ENGINE_STALLING_THR will be raised by 200 rpm.

The component 209 forms the difference between the actually filtered engine speed FILTERED_ENGINE_SPEED on line 225 and the signal ENGINE_STALLING_THR. According to equation (1), this signal on line 232 is still multiplied by a factor K1 (component 210) in order to generate the signal ENGINE_STABILITY_RESERVE on the output line 233 which represents the still remaining load-carrying capacity of the engine.

FIG. 5 illustrates an exemplary device which influences the state transitions on a wheel of the vehicle according to FIG. 2 by way of the calculated engine stability reserve ENGINE_STABILITY_RESERVE on the input line 254.

To this end, the states on the wheel circuit determined by the standard BTCS are initially read in by way of the three-bit-line 250. When a state (e.g. Pressure_increase) is satisfied, the corresponding bit-line (252 in this case) is set to logical '1', otherwise to '0'. Therefore, a current BTCS state is precisely defined by means of the information on the three lines 251, 252, and 253, and it is assumed as a simplification that, according to FIG. 2, there are only the three states 'control inactive', 'pressure increase' and 'pressure decrease'.

The component 240 compares the ENGINE_STABILITY_RESERVE with an upper threshold value Upper_stability_threshold. When the stability reserve lies below the threshold, the line 257 is switched to logical '1', otherwise to 0. When line 257 is at '1', i.e., the stability reserve is relatively small, a logical '1' is applied to line 259 by means of the logical AND-gate of the component 242.

This signal 'Keep_btcs_inactive' sends the message to the standard-BTCS that BTCS shall remain inactive, irrespective of the behavior of the wheel concerned, because a BTCS-activation could cause an instantaneous overload of the engine and an inexpedient and uncomfortable intervention which would be inefficient in terms of traction improvement.

However, when logical '0', that means a sufficient engine stability reserve, prevails on line 257, the output 260 is drawn to logical '1' by way of the logical input negation of component 245 if likewise the signal 'BTCS_inactive' on line 251 has adopted logical '1'.

This signal 'Allow_transition_to_pressure_increase' indicates to the standard-BTCS that a transition from the inactive BTCS-state to pressure increase on the respective wheel is possible when the wheel behavior renders the pressure increase necessary.

Further, the logical AND-operation of the component 244 will set the output signal 263 to logical '1' when the line 257 is at '1' (small reserve) and the standard-BTCS-controller on the respective wheel is in the state of 'pressure decrease', i.e., the line 253 has assumed to '1'.

The signal 'Inhibit_transition_to_pressure_increase' on line 263 indicates to the standard-BTCS-controller that it shall stay in the 'pressure decrease' state, even if the wheel behavior would require a pressure increase, because no engine torque is available for a further increase. Should, however, the torque be sufficient, i.e., should '0' prevail on line 263, the logical input negation of component 247 will generate a logical '1' on line 264, provided the signal 'Pressure_decrease' also prevails as '1' on line 253. Then it is indicated with the signal 'Allow_transition_to_pressure_increase' set to '1' that a transition from pressure decrease to pressure increase is possible when the standard BTCS has detected a corresponding wheel behavior.

Further, the signal ENGINE_STABILITY_RESERVE on line 254 is compared by means of component 241 with the invariable lower threshold value 'Lower_stability_threshold' on line 256.

When the reserve is greater than the threshold or is at least equal thereto, line 258 will be set to logical '1', otherwise to '0'.

When the standard BTCS-controller has adopted the state 'Pressure_increase' (line 252 is set to logical '1'), '1' is also connected to line 261 by way of the logical AND-operation of component 243.

The signal 'Allow_pressure_increase' indicates to the standard-BTCS that the engine stability allows remaining in the pressure increase phase.

Should ENGINE_STABILITY_RESERVE lie below the lower threshold value though, the result is a logical '0' on line 258 and, hence, also on line 261. In this case, a '1' is applied to line 262 by way of the logical input negation of component 246, provided that likewise the signal 'Pressure_increase' on line 252 is set to '1'.

Thus, the set signal 'Switch_to_pressure_decrease' indicates to the standard BTCS-controller that a phase transition from pressure increase to pressure decrease is absolutely necessary to prevent engine overload.

FIG. 6 represents a realization example for the device which, according to equations (7) and (8), calculates corrected pause times for the standard BTCS on a wheel from the engine stability reserve ENGINE_STABILITY_RESERVE. A device of this type must be provided for all driven wheels of the vehicle for which a BTCS-control is conceived.

It principally applies that in the case of a pressure increase on a BTCS-controlled wheel a lower pressure gradient is demanded when there is a small engine stability reserve.

In the case of pressure decrease on a wheel, the device in FIG. 6 can predefine a shortened pause time, i.e., a greater pressure decrease gradient, when the reserve is low. By means of component 272, initially the maximum is formed of value 1 on line 282 and of the existing stability reserve ENGINE_STABILITY_RESERVE on line 280 and applied to line 283. The constant on line 284 is divided by this value by means of component 270. Thus, a pressure increase pause time appears on line 286 which the device tolerates as a minimum alone due to the engine stability reserve. Therefore, a maximum is formed by way of component 273 between this value and the pause time PAUSE_TIME, which the BTCS controller has calculated for the wheel alone by way of the wheel behavior. When the BTCS on this wheel is actually in a pressure increase phase, i.e., the bit 'Pressure_increase' on the bit line 292 of the wheel control state of the input line 290 lies on logical '1', the switch 275 will be closed and the value of line 288 is actually applied to the output line 294 so that the specified pressure increase pause is returned as signal 'CORRECTED_PAUSE_TIME' to the standard BTCS.

In parallel to the calculation described hereinabove, the components 271 and 274 form an appropriate pause time in the case of the pressure decrease on the respective wheel.

First the component 271 multiplies the constant K4 on the line 285 with the engine stability reserve ENGINE_STABILITY_RESERVE on line 280.

The result on line 287 represents the maximum pressure decrease pause time which the device tolerates due to the engine situation. By way of component 274, the minimum of this value and of the pause time PAUSE_TIME calculated by the standard BTCS is formed on line 281. This minimum value represents the final pause time for the pressure decrease on the respective wheel and is then connected to output line 294 by way of switch 276 when the respective wheel is actually in the pressure decrease phase, i.e., the signal 'Pressure_decrease' on the status line 293 is logical '1'.

When the wheel is not in an active BTCS control, the status signal 'BTCS_inactive' on line 291 is at '1' and the signals on lines 292 and 293 have both adopted '0'. In this case, both switches 275 and 276 remain open, and the device does not relay any corrected pause time to the standard BTCS.

In order to dimension the constants K3 and K4, an exemplary calculation is performed:

According to FIG. 3, the gradient of a pressure increase or decrease is defined by the pause time between two pressure pulses and the intensity of the pressure pulses itself.

Under the assumption that an application of standard pulses is possible by means of an appropriate pressure model formation of the brake, the gradient is calculated as $$\text{pressure gradient}=\text{standard pressure pulse}/\text{PAUSE\_TIME}$$

The ENGINE_STABILITY_RESERVE includes a value which, according to equation (1), is formed of a speed difference multiplied by a constant factor K1. If this factor e.g. had the value 1/rpm, the ENGINE_STABILITY_RESERVE would adopt the value 100, when the speed difference in equation (1) has the value 100 rpm.

If the constant K3 e.g. had the value 25 s, a pause time of 0.25 seconds would be calculated with a stability reserve of 100. With a standard pulse of 2 bar, a maximally tolerated pressure gradient of 8 bar/s would result.

In the case of a stability reserve of 1000, the result would be 80 bar/s.

The constant K4 is relevant during pressure decrease.

If K4 e.g. had a value of 0.0001 s, a minimum pause time of 10 milliseconds would be permitted in the event of a stability reserve of 100. With a standard pulse of 2 bar, the result would be a pressure decrease gradient of 200 bar/s. With a reserve of 1000, the pause time would amount to 0.1 s and the pressure decrease gradient 20 bar/s.

What is claimed is:

1. Method for controlling traction slip, comprising the steps of:
    determining a first variable defining a wheel behavior on at least one of a driven wheel,
    defining control states including increase brake pressure, decrease brake pressure, and maintain brake pressure,
    controlling said control states in dependence on the determined variable,
    regulating a change-over between the control states including increasing brake pressure, decreasing brake pressure, maintaining brake pressure, or switching on or off traction slip control,
    determining a second variable, wherein said second variable is representative of the stability of a running engine speed and a dynamic instability threshold, wherein the dynamic instability threshold is formed from a vehicle-related base value and a share value formed proportionally to the gradient of the engine speed, wherein said engine stability variable is used in controlling said control states wherein the running stability of the engine is calculated from the difference between an engine speed$_{F\text{-}E\text{-}S}$ and a dynamic instability threshold of the engine, preferably according to the following relation:

$$\text{ENGINE\_STABILITY\_RESERVE}=K1\cdot(\text{FILTERED\_ENGINE\_SPEED}-\text{ENGINE\_STALLING\_THR}),$$

wherein ENGINE_STABILITY_RESERVE=running stability of the engine, K1=a constant dependent on the engine characteristic and on the average vehicle weight, FILTERED_ENGINE_SPEED=the filtered engine speed, and ENGINE_STALLING_THR is the instability threshold.

2. Method as claimed in claim 1, wherein the second variable is continuously taken into consideration in the control and/or the change-over of control states.

3. Method as claimed in claim 1, further including a filter for producing the engine speed$_{F\_E\_S}$, a filter of first order with a filter time constant T_filt=n*T, is employed producing the filtered value of the engine speed$_{F\_E\_S}$ according to the relation FILTERED_ENGINE_SPEED=FILTERED_ENGINE_SPEED+
n*(ENGINE_SPEED−FILTERED_ENGINE_SPEED), wherein T=the run time of the control loop FILTERED_ENGINE_SPEED=filtered engine speed, n=number of the current loop (with n=2, 3, 4 . . . ) and ENGINE_SPEED= current engine speed.

4. Method as claimed in claim 1, wherein the dynamic instability threshold is determined from a vehicle-related base value and a share value defined proportionally to the gradient of the engine speed, the said share value being subtracted from the base value.

5. Method as claimed in claim 1, wherein the dynamic instability threshold is produced according to the following relation:

ENGINE_STALLING_THR=BASE_THR−K2*FILTERED_ENGINE_SPEED_GRADIENT wherein ENGINE_STALLING_THR represents the dynamic instability threshold, BASE_THR is a vehicle-responsive base value, K2 is a constant dependent on the engine speed, and FILTERED_ENGINE_SPEED_GRADIENT is the gradient of the filtered engine speed.

6. Method as claimed in claim 1, wherein the vehicle related base value is produced according to the following relation:

BASE_THR=ENGINE_dependent_value+f(VEHICLE_REFERENCE_VELOCITY), wherein BASE_THR is the vehicle-dependent base value, ENGINE_dependent_value is a variable dependent on the engine speed, and f(VEHICLE_REFERENCE_VELOCITY) is a function dependent on the vehicle speed.

7. Method as claimed in claim 1, wherein the change-over from a control state of pressure increase to a control state of pressure decrease is identified when at least one of the following conditions is satisfied:

first variable<lower slip threshold
second variable<lower stability threshold,
and in that the change-over from a control state of pressure decrease to a control state of pressure increase is identified when at least the following conditions are satisfied:
first variable≧upper slip threshold
second variable≧upper stability threshold.

8. Method as claimed in claim 1, wherein the change-over from a control state of pressure decrease to a switching off of the traction slip control is identified when at least the following conditions are satisfied:

first variable<upper slip threshold, or
second variable<upper stability threshold,
wheel model pressure=0, wherein the wheel model pressure is the actual brake pressure in the wheel considered which is calculated in a pressure model.

9. Method as claimed in claim 1, wherein traction slip control is identified as switched-off when at least one of the following conditions is satisfied:

first variable<upper slip threshold
second variable<upper stability threshold.

10. Method as claimed in claim 1, wherein the change-over from a deactivated traction slip control to a control state of pressure increase is identified when at least the following conditions are satisfied:

first variable≧upper slip threshold
second variable≧upper stability threshold.

11. Method as claimed in claim 1, wherein a control state of pressure increase is identified when at least the following conditions are satisfied:

first variable≧lower slip threshold
second variable≧lower stability threshold.

12. Method as claimed in claim 1, wherein a control state of pressure decrease is identified when at least the following conditions are satisfied:

first variable<upper slip threshold, or
second variable<upper stability threshold,
wheel model pressure>0, wherein the wheel model pressure is the actual brake pressure in the wheel considered which is calculated in a pressure model.

13. Method as claimed in claim 1, wherein the pressure increase and decrease is produced by gradual actuation of a pressure source or switch valves in accordance with the first and second variable.

14. Method as claimed in claim 13, wherein the pressure increase gradient is determined by way of the signal PAUSE_TIME related to the first variable and is modified with a value that is inversely proportional to the running stability according to the following relations:

PAUSE_TIME<K3/ENGINE_STABILITY_RESERVE from this follows: PAUSE_TIME=K3/ENGINE_STABILITY_RESERVE, wherein PAUSE_TIME=pause time of the pulse-pause ratio during pressure increase and decrease, K3=constant which takes into consideration the characteristic of the brake and the level of the pressure stages, ENGINE_STABILITY_RESERVE=running stability of the engine.

15. Method as claimed in claim 13, wherein a maximum pressure increase gradient is produced in dependence on the second variable, and in that a steeper pressure increase occurs in the event of a high running stability and a flatter pressure increase occurs with a low running stability.

16. Method as claimed in claim 13, wherein the pressure decrease gradient is determined by way of the signal PAUSE_TIME that is related to the first variable, and is modified with a value proportional to the running stability according to the following relations:

PAUSE_TIME>K4•ENGINE_STABILITY_RESERVE from this follows: PAUSE_TIME=K4•ENGINE_STABILITY_RESERVE, wherein PAUSE_TIME=pause time of the pulse-pause ratio during pressure increase and decrease, K4=constant that takes into consideration the characteristic of the brake and the level of the pressure stages, ENGINE_STABILITY_RESERVE=running stability of the motor.

17. Method as claimed in claim 13, wherein a minimum pressure increase gradient is produced in dependence on the second variable, and in that a flatter pressure decrease occurs with a high running stability and a steeper pressure decrease occurs with a low running stability.

18. Device for controlling traction slip, comprising:
a first determination device for determining a variable defining the wheel behavior on at least one of the driven wheels and for controlling, in dependence on this variable, determining control states including increase brake pressure, decrease brake pressure, maintain brake pressure, and for regulating the change-over between the control states, including increase brake pressure, decrease brake pressure, maintain brake pressure, or switch on or off traction slip control, a second determination device for determining an engine stability variable that represents the running stability of the engine, wherein the running stability variable is determined from the engine speed and a dynamic instability threshold, wherein said dynamic instability threshold is a function of a vehicle-related base value and a share value formed proportionally to the gradient of the engine speed, and wherein the first determination device uses the engine stability variable in controlling said control states or for controlling the change-over between the control states wherein the second determination device calculates the running stability according to the following relation:

ENGINE_STABILITY_RESERVE=$K1$•(FILTERED_ENGINE_SPEED−ENGINE_STALLING_THR), wherein ENGINE_STABILITY_RESERVE=running stability of the engine, K1=a constant dependent on the engine characteristic and on the average vehicle weight, FILTERED_ENGINE_SPEED=the filtered engine speed, and ENGINE_STALLING_THR is the instability threshold.

19. Device as claimed in claim 18, wherein the first determination device continuously takes the second variable into consideration in the control or the change-over.

20. Device as claimed in claim 18, wherein the second determination device produces the running stability of the engine from the difference between an engine speed$_{F\_E\_S}$ and a dynamic instability threshold of the engine.

21. Device as claimed in claim 18, wherein the second determination device includes a filter for producing the filtered engine speed$_{F\_E\_S}$ with a filter time constant T_filt=n*T, wherein
T=the run time of the control loop, n=factor.

22. Device as claimed in claim 21, wherein the filter includes a memory which stores the preceding value FILTERED_ENGINE_SPEED, in that the filter includes a subtractor which subtracts the engine speed ENGINE_SPEED from the preceding value FILTERED_ENGINE_SPEED, in that the filter includes a multiplier which multiplies the difference between the values ENGINE_SPEED and FILTERED_ENGINE_SPEED with a factor n, and in that the filter includes an adder which adds the difference multiplied by the factor n to the preceding value FILTERED_ENGINE_SPEED.

23. Device as claimed in claim 18, wherein the second determination device determines the dynamic instability threshold ENGINE_STALLING_THR from a vehicle-related base value BASE_THR and a share value K2•FILTERED_ENGINE_SPEED_GRADIENT determined proportionally to the gradient of the engine speed.

24. Device as claimed in claim 18, further including a subtractor for subtracting the preceding value FILTERED_ENGINE_SPEED from the current value FILTERED_ENGINE_SPEED and sending this difference value to a multiplier which multiplies the difference by a constant factor K2.

25. Device as claimed in claim 24, wherein the constant factor K2 lies in a range between 0.1 s and 0.5 s.

26. Device as claimed in claim 18, further including a calculation unit for determining a function of the vehicle speed VEHICLE_REFERENCE_VELOCITY, and in that the signal VEHICLE_REFERENCE_VELOCITY is applied to an input of an adder, to the other input of which a vehicle-related constant ENGINE_DEPENDENT_VALUE is applied, and the adder adds on the signal ENGINE_DEPENDENT_VALUE the signal VEHICLE_REFERENCE_VELOCITY to form the signal BASE_THR.

27. Device as claimed in claim 26, further including a first subtractor having one of its inputs connected to the adder and having another of its inputs connected to a first multiplier, wherein the subtractor subtracts the base value BASE_THR from the share value K2•FILTERED_ENGINE_SPEED_GRADIENT and produces the signal ENGINE_STALLING_THR.

28. Device as claimed in claim 27, further including a second subtractor and a second multiplier wherein the second subtractor produces the difference signal between the signals ENGINE_STALLING_THR and FILTERED_ENGINE_SPEED, and in that the second multiplier multiplies this difference signal by a factor K1.

29. Device as claimed in claim 18, further including comparing elements and logical switching element (242, 243, 244, 245, 246, 247) are provided which cause a change-over from a control state of pressure increase to a control state of pressure decrease when at least one of the following conditions is satisfied:
first variable (BTCS_CONTROL_STATE)<lower slip threshold
second variable (ENGINE_STABILITY_RESERVE) <lower stability threshold,
and in that the comparing elements (240, 241) and logical switching elements (242, 243, 244, 245, 246, 247) cause the change-over from a control state of pressure decrease or engine torque increase to a control state of pressure increase when at least the following conditions are satisfied:
first variable (BTCS_CONTROL_STATE)≧upper slip threshold
second variable (ENGINE_STABILITY_RESERVE) ≧upper stability threshold.

30. Device as claimed in claim 18, further including comparing elements and logical switching elements which cause a change-over from a control state of pressure decrease to a deactivation of traction slip control when at least the following conditions are satisfied:
first variable<upper slip threshold, or
second variable<upper stability threshold,
wheel model pressure=0, wherein the wheel model pressure is the actual brake pressure in the considered wheel calculated in a pressure model.

31. Device as claimed in claim 30, wherein the comparing elements and logical switching elements identify a traction slip control as switched off when at least one of the following conditions is satisfied:
first variable<upper slip threshold, or
second variable<upper stability threshold.

32. Device as claimed in claim 18, further including comparing elements and logical switching elements are provided which cause a change-over from a deactivated traction slip control to a control state of pressure increase when at least the following conditions are satisfied:
first variable≧upper slip threshold, or
second variable≧upper stability threshold.

33. Device as claimed in claim 18, further including comparing elements and logical switching elements which control a control state of pressure increase when at least the following conditions are satisfied:
first variable≧lower slip threshold, or
second variable≧lower stability threshold.

34. Device as claimed in claim 18, further including comparing elements and logical switching elements are provided which control a control state of pressure decrease when at least the following conditions are satisfied:

first variable<upper slip threshold, or second variable<upper stability threshold, wheel pressure model>0, wherein the wheel model pressure is the actual brake pressure in the considered wheel calculated in a pressure model.

35. Device as claimed in claim 18, further including a third determination device for controlling or regulating the pressure increase and decrease by gradual actuation of a pressure source or switching valves in accordance with the first and second variables.

36. Device as claimed in claim 35, wherein the pressure increase gradient is determined by way of the signal PAUSE_TIME that is related to the first variable, and is modified in a calculation unit with a value that is inversely proportional to the running stability according to the following relations:

PAUSE_TIME<$K3$/ENGINE_STABILITY_RESERVE from this follows: PAUSE_TIME=$K3$/ENGINE_STABILITY_RESERVE, wherein PAUSE_TIME=pause time of the pulse-pause ratio during pressure increase and decrease, K3=constant which takes into consideration the characteristic of the brake and the level of the pressure stages, ENGINE_STABILITY_RESERVE=running stability of the engine.

37. Device as claimed in claim 36, wherein the calculation unit includes a maximizer which calculates a maximum from the value 1 and the second variable, in that the maximizer is connected to a divider which divides the constant K3 by the maximum of the signal ENGINE_STABILITY_RESERVE, wherein the maximizer produces the maximum pressure increase gradient from the signal PAUSE_TIME produced in dependence on the first variable and the output variable of the divider, and in that logic elements in dependence on the first variable initiate a steeper pressure increase in the event of a high running stability and a flatter pressure increase in the event of a low running stability.

38. Device as claimed in claim 35, wherein the pressure decrease gradient is determined by way of the signal PAUSE_TIME that is related to the first variable and is modified with a value proportional to the running stability according to the following relations:

PAUSE_TIME>$K4$•ENGINE_STABILITY_RESERVE from this follows: PAUSE_TIME=$K4$•ENGINE_STABILITY_RESERVE, wherein PAUSE_TIME=pause time of the pulse-pause ratio during pressure increase and decrease, K4=constant that takes into consideration the characteristic of the brake and the level of the pressure stages, ENGINE_STABILITY_RESERVE=running stability of the motor.

39. Device as claimed in claim 37, wherein the calculation unit includes a multiplier which multiplies the second variable ENGINE_STABILITY_RESERVE with the constant K4, and in that a minimizer produces the minimum pressure increase gradient from the signal PAUSE_TIME produced in dependence on the first variable and the output variable of the multiplier, and in that logic elements in dependence on the first variable initiate a flatter pressure decrease in the event of a high running stability and a steeper pressure decrease in the event of a low running stability.

40. Method for controlling traction slip, comprising the steps of:

determining a first variable defining a wheel behavior on at least one of a driven wheel, defining control states including increase brake pressure, decrease brake pressure, and maintain brake pressure, controlling said control states in dependence on the determined variable, regulating a change-over between the control states including increasing brake pressure, decreasing brake pressure, maintaining brake pressure, or switching on or off traction slip control, determining a second variable, wherein said second variable is representative of the stability of a running engine speed and a dynamic instability threshold, wherein the dynamic instability threshold is formed from a vehicle-related base value and a share value formed proportionally to the gradient of the engine speed, wherein said engine stability variable is used in controlling said control states wherein the dynamic instability threshold is determined from a vehicle-related base value and a share value defined proportionally to the gradient of the engine speed, the said share value being subtracted from the base value.

41. Method for controlling traction slip, comprising the steps of:

determining a first variable defining a wheel behavior on at least one of a driven wheel, defining control states including increase brake pressure, decrease brake pressure, and maintain brake pressure, controlling said control states in dependence on the determined variable, regulating a change-over between the control states including increasing brake pressure, decreasing brake pressure, maintaining brake pressure, or switching on or off traction slip control, determining a second variable, wherein said second variable is representative of the stability of a running engine speed and a dynamic instability threshold, wherein the dynamic instability threshold is formed from a vehicle-related base value and a share value formed proportionally to the gradient of the engine speed, wherein said engine stability variable is used in controlling said control states wherein the dynamic instability threshold is produced according to the following relation:

ENGINE_STALLING_THR=BASE_THR−$K2$*FILTERED_ENGINE_SPEED_GRADIENT wherein ENGINE_STALLING_THR represents the dynamic instability threshold, BASE_THR is a vehicle-responsive base value, K2 is a constant dependent on the engine speed, and FILTERED_ENGINE_SPEED_GRADIENT is the gradient of the filtered engine speed.

42. Method for controlling traction slip, comprising the steps of:

determining a first variable defining a wheel behavior on at least one of a driven wheel, defining control states including increase brake pressure, decrease brake pressure, and maintain brake pressure, controlling said control states in dependence on the determined variable, regulating a change-over between the control states including increasing brake pressure, decreasing brake pressure, maintaining brake pressure, or switching on or off traction slip control, determining a second variable, wherein said second variable is representative of the stability of a running engine speed and a dynamic instability threshold, wherein the dynamic instability threshold is formed from a vehicle-related base value and a share value formed proportionally to the gradient of the engine speed, wherein said engine stability variable is used in controlling said control states wherein the vehicle related base value is produced according to the following relation:

$$BASE\_THR = ENGINE\_dependent\_value + f(VEHICLE\_REFERENCE\_VELOCITY),$$

wherein BASE_THR is the vehicle-dependent base value, ENGINE_dependent_value is a variable dependent on the engine speed, and f(VEHICLE_REFERENCE_VELOCITY) is a function dependent on the vehicle speed.

43. Method for controlling traction slip, comprising the steps of:
   determining a first variable defining a wheel behavior on at least one of a driven wheel,
   defining control states including increase brake pressure, decrease brake pressure, and maintain brake pressure,
   controlling said control states in dependence on the determined variable,
   regulating a change-over between the control states including increasing brake pressure, decreasing brake pressure, maintaining brake pressure, or switching on or off traction slip control,
   determining a second variable, wherein said second variable is representative of the stability of a running engine speed and a dynamic instability threshold, wherein the dynamic instability threshold is formed from a vehicle-related base value and a share value formed proportionally to the gradient of the engine speed, wherein said engine stability variable is used in controlling said control states wherein the change-over from a control state of pressure increase to a control state of pressure decrease is identified when at least one of the following conditions is satisfied:
   first variable<lower slip threshold
   second variable<lower stability threshold,
   and in that the change-over from a control state of pressure decrease to a control state of pressure increase is identified when at least the following conditions are satisfied:
   first variable≧upper slip threshold
   second variable≧upper stability threshold.

44. Method for controlling traction slip, comprising the steps of:
   determining a first variable defining a wheel behavior on at least one of a driven wheel,
   defining control states including increase brake pressure, decrease brake pressure, and maintain brake pressure,
   controlling said control states in dependence on the determined variable,
   regulating a change-over between the control states including increasing brake pressure, decreasing brake pressure, maintaining brake pressure, or switching on or off traction slip control,
   determining a second variable, wherein said second variable is representative of the stability of a running engine speed and a dynamic instability threshold, wherein the dynamic instability threshold is formed from a vehicle-related base value and a share value formed proportionally to the gradient of the engine speed, wherein said engine stability variable is used in controlling said control states wherein the change-over from a control state of pressure decrease to a switching off of the traction slip control is identified when at least the following conditions are satisfied:
   first variable<upper slip threshold, or
   second variable<upper stability threshold,
   wheel model pressure=0, wherein the wheel model pressure is the actual brake pressure in the wheel considered which is calculated in a pressure model.

45. Method for controlling traction slip, comprising the steps of:
   determining a first variable defining a wheel behavior on at least one of a driven wheel,
   defining control states including increase brake pressure, decrease brake pressure, and maintain brake pressure,
   controlling said control states in dependence on the determined variable,
   regulating a change-over between the control states including increasing brake pressure, decreasing brake pressure, maintaining brake pressure, or switching on or off traction slip control,
   determining a second variable, wherein said second variable is representative of the stability of a running engine speed and a dynamic instability threshold, wherein the dynamic instability threshold is formed from a vehicle-related base value and a share value formed proportionally to the gradient of the engine speed, wherein said engine stability variable is used in controlling said control states wherein traction slip control is identified as switched-off when at least one of the following conditions is satisfied:
   first variable<upper slip threshold
   second variable<upper stability threshold.

46. Method for controlling traction slip, comprising the steps of:
   determining a first variable defining a wheel behavior on at least one of a driven wheel,
   defining control states including increase brake pressure, decrease brake pressure, and maintain brake pressure,
   controlling said control states in dependence on the determined variable,
   regulating a change-over between the control states including increasing brake pressure, decreasing brake pressure, maintaining brake pressure, or switching on or off traction slip control,
   determining a second variable, wherein said second variable is representative of the stability of a running engine speed and a dynamic instability threshold, wherein the dynamic instability threshold is formed from a vehicle-related base value and a share value formed proportionally to the gradient of the engine speed, wherein said engine stability variable is used in controlling said control states the change-over from a deactivated traction slip control to a control state of pressure increase is identified when at least the following conditions are satisfied:
   first variable≧upper slip threshold
   second variable≧upper stability threshold.

47. Device for controlling traction slip, comprising:
   a first determination device for determining a variable defining the wheel behavior on at least one of the driven wheels and for controlling, in dependence on this variable, determining control states including increase brake pressure, decrease brake pressure, maintain brake pressure, and for regulating the change-over between the control states, including increase brake pressure, decrease brake pressure, maintain brake pressure, or switch on or off traction slip control, a second determination device for determining an engine stability variable that represents the running stability of the engine, wherein the running stability variable is determined from the engine speed and a dynamic instability threshold, wherein said dynamic instability threshold is a function of a vehicle-related base value and a share value formed proportionally to the gradient of the engine speed, and wherein the first determination device uses the engine stability variable in controlling said control states or for controlling the change-over between the control states wherein the second determination device includes a filter for producing the filtered engine speed$_{F\_E\_S}$ with a filter time constant T_filt=n*T, wherein $T$=the run time of the control loop, $n$=factor.

48. Device for controlling traction slip, comprising:

a first determination device for determining a variable defining the wheel behavior on at least one of the driven wheels and for controlling, in dependence on this variable, determining control states including increase brake pressure, decrease brake pressure, maintain brake pressure, and for regulating the change-over between the control states, including increase brake pressure, decrease brake pressure, maintain brake pressure, or switch on or off traction slip control, a second determination device for determining an engine stability variable that represents the running stability of the engine, wherein the running stability variable is determined from the engine speed and a dynamic instability threshold, wherein said dynamic instability threshold is a function of a vehicle-related base value and a share value formed proportionally to the gradient of the engine speed, and wherein the first determination device uses the engine stability variable in controlling said control states or for controlling the change-over between the control states wherein the second determination device determines the dynamic instability threshold ENGINE_STALLING_THR from a vehicle-related base value BASE_THR and a share value K2•FILTERED_ENGINE_SPEED_GRADIENT determined proportionally to the gradient of the engine speed.

49. Device for controlling traction slip, comprising:

a first determination device for determining a variable defining the wheel behavior on at least one of the driven wheels and for controlling, in dependence on this variable, determining control states including increase brake pressure, decrease brake pressure, maintain brake pressure, and for regulating the change-over between the control states, including increase brake pressure, decrease brake pressure, maintain brake pressure, or switch on or off traction slip control, a second determination device for determining an engine stability variable that represents the running stability of the engine, wherein the running stability variable is determined from the engine speed and a dynamic instability threshold, wherein said dynamic instability threshold is a function of a vehicle-related base value and a share value formed proportionally to the gradient of the engine speed, and wherein the first determination device uses the engine stability variable in controlling said control states or for controlling the change-over between the control states further including a subtractor for subtracting the preceding value FILTERED_ENGINE_SPEED from the current value FILTERED_ENGINE_SPEED and sending this difference value to a multiplier which multiplies the difference by a constant factor K2.

50. Device for controlling traction slip, comprising:

a first determination device for determining a variable defining the wheel behavior on at least one of the driven wheels and for controlling, in dependence on this variable, determining control states including increase brake pressure, decrease brake pressure, maintain brake pressure, and for regulating the change-over between the control states, including increase brake pressure, decrease brake pressure, maintain brake pressure, or switch on or off traction slip control, a second determination device for determining an engine stability variable that represents the running stability of the engine, wherein the running stability variable is determined from the engine speed and a dynamic instability threshold, wherein said dynamic instability threshold is a function of a vehicle-related base value and a share value formed proportionally to the gradient of the engine speed, and wherein the first determination device uses the engine stability variable in controlling said control states or for controlling the change-over between the control states further including a calculation unit for determining a function of the vehicle speed VEHICLE_REFERENCE_VELOCITY, and in that the signal VEHICLE_REFERENCE_VELOCITY is applied to an input of an adder, to the other input of which a vehicle-related constant ENGINE_DEPENDENT_VALUE is applied, and the adder adds on the signal ENGINE_DEPENDENT_VALUE the signal VEHICLE_REFERENCE_VELOCITY to form the signal BASE_THR.

51. Device for controlling traction slip, comprising:

a first determination device for determining a variable defining the wheel behavior on at least one of the driven wheels and for controlling, in dependence on this variable, determining control states including increase brake pressure, decrease brake pressure, maintain brake pressure, and for regulating the change-over between the control states, including increase brake pressure, decrease brake pressure, maintain brake pressure, or switch on or off traction slip control, a second determination device for determining an engine stability variable that represents the running stability of the engine, wherein the running stability variable is determined from the engine speed and a dynamic instability threshold, wherein said dynamic instability threshold is a function of a vehicle-related base value and a share value formed proportionally to the gradient of the engine speed, and wherein the first determination device uses the engine stability variable in controlling said control states or for controlling the change-over between the control states further including comparing elements and logical switching element (242, 243, 244, 245, 246, 247) are provided which cause a change-over from a control state of pressure increase to a control state of pressure decrease when at least one of the following conditions is satisfied:

first variable (BTCS_CONTROL_STATE)<lower slip threshold second variable (ENGINE_STABILITY_RESERVE) <lower stability threshold, and in that the comparing elements (240, 241) and logical switching elements (242, 243, 244, 245, 246,

247) cause the change-over from a control state of pressure decrease or engine torque increase to a control state of pressure increase when at least the following conditions are satisfied:
first variable (BTCS_CONTROL_STATE)≧upper slip threshold
second variable (ENGINE_STABILITY_RESERVE)≧upper stability threshold.

52. Device for controlling traction slip, comprising:

a first determination device for determining a variable defining the wheel behavior on at least one of the driven wheels and for controlling, in dependence on this variable, determining control states including increase brake pressure, decrease brake pressure, maintain brake pressure, and for regulating the change-over between the control states, including increase brake pressure, decrease brake pressure, maintain brake pressure, or switch on or off traction slip control, a second determination device for determining an engine stability variable that represents the running stability of the engine, wherein the running stability variable is determined from the engine speed and a dynamic instability threshold, wherein said dynamic instability threshold is a function of a vehicle-related base value and a share value formed proportionally to the gradient of the engine speed, and wherein the first determination device uses the engine stability variable in controlling said control states or for controlling the change-over between the control states further including comparing elements and logical switching elements are provided which cause a change-over from a deactivated traction slip control to a control state of pressure increase when at least the following conditions are satisfied:
first variable≧upper slip threshold, or
second variable≧upper stability threshold.

53. Device for controlling traction slip, comprising:

a first determination device for determining a variable defining the wheel behavior on at least one of the driven wheels and for controlling, in dependence on this variable, determining control states including increase brake pressure, decrease brake pressure, maintain brake pressure, and for regulating the change-over between the control states, including increase brake pressure, decrease brake pressure, maintain brake pressure, or switch on or off traction slip control, a second determination device for determining an engine stability variable that represents the running stability of the engine, wherein the running stability variable is determined from the engine speed and a dynamic instability threshold, wherein said dynamic instability threshold is a function of a vehicle-related base value and a share value formed proportionally to the gradient of the engine speed, and wherein the first determination device uses the engine stability variable in controlling said control states or for controlling the change-over between the control states further including comparing elements and logical switching elements which control a control state of pressure increase when at least the following conditions are satisfied:
first variable≧lower slip threshold, or
second variable≧lower stability threshold.

54. Device for controlling traction slip, comprising:

a first determination device for determining a variable defining the wheel behavior on at least one of the driven wheels and for controlling, in dependence on this variable, determining control states including increase brake pressure, decrease brake pressure, maintain brake pressure, and for regulating the change-over between the control states, including increase brake pressure, decrease brake pressure, maintain brake pressure, or switch on or off traction slip control, a second determination device for determining an engine stability variable that represents the running stability of the engine, wherein the running stability variable is determined from the engine speed and a dynamic instability threshold, wherein said dynamic instability threshold is a function of a vehicle-related base value and a share value formed proportionally to the gradient of the engine speed, and wherein the first determination device uses the engine stability variable in controlling said control states or for controlling the change-over between the control states further including comparing elements and logical switching elements are provided which control a control state of pressure decrease when at least the following conditions are satisfied:
first variable<upper slip threshold, or
second variable<upper stability threshold,
wheel pressure model>0, wherein the wheel model pressure is the actual brake pressure in the considered wheel calculated in a pressure model.

55. Device for controlling traction slip, comprising:

a first determination device for determining a variable defining the wheel behavior on at least one of the driven wheels and for controlling, in dependence on this variable, determining control states including increase brake pressure, decrease brake pressure, maintain brake pressure, and for regulating the change-over between the control states, including increase brake pressure, decrease brake pressure, maintain brake pressure, or switch on or off traction slip control, a second determination device for determining an engine stability variable that represents the running stability of the engine, wherein the running stability variable is determined from the engine speed and a dynamic instability threshold, wherein said dynamic instability threshold is a function of a vehicle-related based value and a share value formed proportionally to the gradient of the engine speed, and wherein the first determination device uses the engine stability variable in control said control states or for controlling the change-over between the control states further including a third determination device for controlling or regulating the pressure increase and decrease by gradual actuation of a pressure source or switching valves in accordance with the first and second variables.

* * * * *

UNITED STATES PATENT AND TRADEMARK OFFICE
CERTIFICATE OF CORRECTION

PATENT NO. : 6,701,243 B1   Page 1 of 1
DATED : March 2, 2004
INVENTOR(S) : Georg Roll It is certified that error appears in the above-identified patent and that said Letters Patent is hereby corrected as shown below:

<u>Column 24,</u>
Line 29, please change "vehicle-related based value" to -- vehicle-related base value --.
Line 52, please change "variable in control said" to -- variable in controlling said --.

Signed and Sealed this

Fifteenth Day of June, 2004

JON W. DUDAS
*Acting Director of the United States Patent and Trademark Office*